US009567934B2

(12) United States Patent
Rodriguez

(10) Patent No.: US 9,567,934 B2
(45) Date of Patent: Feb. 14, 2017

(54) CONTROLLERS AND METHODS FOR A FUEL INJECTED INTERNAL COMBUSTION ENGINE

(71) Applicant: Leon Trudeau, Broussard, LA (US)

(72) Inventor: Larry Nic Rodriguez, Broussard, LA (US)

(73) Assignee: ENVIRO FUEL TECHNOLOGY, LP, Broussard, LA (US)

( * ) Notice: Subject to any disclaimer, the term of this patent is extended or adjusted under 35 U.S.C. 154(b) by 523 days.

(21) Appl. No.: 13/921,943

(22) Filed: Jun. 19, 2013

(65) Prior Publication Data

US 2014/0379237 A1   Dec. 25, 2014

(51) Int. Cl.
*F02D 41/30* (2006.01)
*F02D 41/06* (2006.01)
*F02D 41/34* (2006.01)
*F02D 41/28* (2006.01)

(52) U.S. Cl.
CPC ......... *F02D 41/3005* (2013.01); *F02D 41/064* (2013.01); *F02D 41/068* (2013.01); *F02D 41/34* (2013.01); *F02D 2041/281* (2013.01); *F02D 2200/021* (2013.01); *F02D 2400/11* (2013.01); *Y02T 10/44* (2013.01)

(58) Field of Classification Search
CPC .... F02D 41/3005; F02D 41/064; F02D 41/34; F02D 41/068; F02D 2200/021; F02D 2041/281; F02D 2400/11
USPC ......... 701/102–106, 111–115; 123/478, 480, 123/492, 493, 179.16, 179.17, 672
See application file for complete search history.

(56) References Cited

U.S. PATENT DOCUMENTS

| | | | |
|---|---|---|---|
| 3,430,616 A | 3/1969 | Glockler et al. | |
| 3,500,801 A | 3/1970 | Long et al. | |
| 3,504,657 A | 4/1970 | Eichler et al. | |
| 3,548,791 A | 12/1970 | Long | |
| 4,069,795 A | 1/1978 | Long et al. | |
| 4,134,368 A * | 1/1979 | Hadley | F02D 41/32 123/483 |
| 4,539,643 A | 9/1985 | Suzuki et al. | |

(Continued)

FOREIGN PATENT DOCUMENTS

JP   2000018079 A * 1/2000 ............. F02D 45/00
JP   4428160 B2   3/2010

OTHER PUBLICATIONS

PCT International Search Report dated Nov. 12, 2014, issued in International Application PCT/US2014/041644.

(Continued)

*Primary Examiner* — Joseph Dallo
(74) *Attorney, Agent, or Firm* — Ftich, Even, Tabin & Flannery, LLP

(57) ABSTRACT

An internal combustion engine has a fuel injector that is controlled by an engine control unit. According to one embodiment a device receives from a temperature sensor information corresponding to the temperature of the engine. The device transmits substitute temperature information to the engine control unit when the temperature of the engine is within a predetermined range of temperatures. The substitute temperature information corresponds to a temperature that is different than the actual temperature of the ICE. The engine control unit controls the fuel injector so that it operates in response to the substitute temperature information.

19 Claims, 6 Drawing Sheets

(56) References Cited

U.S. PATENT DOCUMENTS

| | | | |
|---|---|---|---|
| 4,556,029 A * | 12/1985 | Yamaguchi | F01P 11/16 123/179.15 |
| 4,636,620 A | 1/1987 | Wright et al. | |
| 4,901,701 A * | 2/1990 | Chasteen | F02D 37/02 123/478 |
| 5,379,740 A | 1/1995 | Moore et al. | |
| 5,430,601 A | 7/1995 | Burcham | |
| 5,794,586 A | 8/1998 | Oda et al. | |
| 6,283,092 B1 * | 9/2001 | Jung | F01P 11/16 123/339.15 |
| 6,302,065 B1 | 10/2001 | Davison | |
| 6,327,860 B1 | 12/2001 | Critchley | |
| 6,647,952 B2 | 11/2003 | Idogawa et al. | |
| 6,647,967 B2 * | 11/2003 | Fukui | F02D 41/182 123/492 |
| 6,763,810 B1 | 7/2004 | Jones | |
| 6,834,641 B2 | 12/2004 | Watanabe | |
| 6,904,890 B2 | 6/2005 | Maitani et al. | |
| 6,922,627 B2 | 7/2005 | Katoh et al. | |
| 6,986,331 B2 * | 1/2006 | Mizutani | F02D 11/105 123/179.15 |
| 7,003,393 B2 * | 2/2006 | Stevens | F02D 41/20 123/478 |
| 7,051,713 B2 | 5/2006 | Mashiki | |
| 7,168,423 B2 * | 1/2007 | Nonaka | F01N 13/008 123/672 |
| 7,693,646 B2 | 4/2010 | Moriya | |
| 7,797,098 B2 * | 9/2010 | Kai | B60W 10/06 701/104 |
| 7,806,104 B2 * | 10/2010 | Sadakane | F02D 41/08 123/339.1 |
| 8,118,010 B2 | 2/2012 | Shibata et al. | |
| 8,161,946 B2 * | 4/2012 | Pursifull | F02D 41/20 123/479 |
| 8,170,778 B2 * | 5/2012 | Ando | F02D 29/02 123/179.16 |
| 8,306,723 B2 | 11/2012 | Haskara et al. | |
| 8,375,923 B2 * | 2/2013 | Pursifull | F02D 41/20 123/479 |
| 8,457,865 B2 * | 6/2013 | Geyer | F02D 41/061 123/179.16 |
| 8,554,447 B2 * | 10/2013 | Okazaki | F02D 41/1454 123/672 |
| 2002/0046729 A1 * | 4/2002 | Kyuuma | F02D 41/047 123/295 |
| 2002/0046730 A1 * | 4/2002 | Hosokawa | F02D 37/02 123/295 |
| 2002/0062813 A1 * | 5/2002 | Miyashita | F02B 23/104 123/295 |
| 2003/0010323 A1 * | 1/2003 | Fukui | F02D 41/182 123/478 |
| 2003/0140614 A1 * | 7/2003 | Nearhoof, Sr. | F02C 9/28 60/39.281 |
| 2004/0172188 A1 * | 9/2004 | Bowling | F02D 41/2422 701/102 |
| 2005/0051140 A1 * | 3/2005 | Yamaguchi | F02D 41/0002 123/479 |
| 2005/0119819 A1 * | 6/2005 | Stevens | F02D 41/20 701/104 |
| 2005/0235974 A1 * | 10/2005 | Nonaka | F02D 41/1453 123/672 |
| 2006/0005812 A1 | 1/2006 | Mashiki | |
| 2006/0021349 A1 * | 2/2006 | Nearhoof, Jr. | F23C 15/00 60/740 |
| 2006/0047468 A1 * | 3/2006 | Aoki | F02D 41/1495 702/132 |
| 2006/0096565 A1 * | 5/2006 | Hattori | F02D 41/062 123/179.5 |
| 2006/0142924 A1 * | 6/2006 | Nakagawa | F02D 41/1497 701/110 |
| 2007/0129878 A1 | 6/2007 | Pepper | |
| 2007/0215095 A1 * | 9/2007 | Kakuya | F02D 37/02 123/295 |
| 2008/0208440 A1 * | 8/2008 | Hiramatsu | F01L 1/344 701/113 |
| 2008/0243356 A1 * | 10/2008 | Kang | F02D 41/0052 701/102 |
| 2009/0048759 A1 * | 2/2009 | Liu | F02D 41/1439 701/103 |
| 2009/0088950 A1 * | 4/2009 | Fisher | F02D 31/002 701/103 |
| 2009/0306879 A1 * | 12/2009 | Takubo | F02D 41/0032 701/104 |
| 2010/0042308 A1 | 2/2010 | Kobayashi et al. | |
| 2010/0043753 A1 | 2/2010 | Gallagher et al. | |
| 2010/0089362 A1 | 4/2010 | Haskara et al. | |
| 2010/0294224 A1 * | 11/2010 | Svensson | F02D 13/0215 123/179.16 |
| 2011/0106414 A1 * | 5/2011 | Leanos | F01M 1/18 701/113 |
| 2011/0125386 A1 * | 5/2011 | Pursifull | F02D 41/20 701/103 |
| 2011/0238255 A1 * | 9/2011 | Sano | B60R 16/0232 701/31.4 |
| 2011/0238261 A1 * | 9/2011 | Tsuyuguchi | B62K 11/14 701/29.2 |
| 2012/0016563 A1 * | 1/2012 | Ohsaki | F02D 41/221 701/102 |
| 2012/0186226 A1 * | 7/2012 | Ren | F01N 3/103 60/274 |
| 2012/0203442 A1 * | 8/2012 | Pursifull | F02D 41/20 701/103 |
| 2012/0266843 A1 * | 10/2012 | Yoshioka | F02M 43/04 123/304 |
| 2013/0098032 A1 * | 4/2013 | Wade | F02D 41/064 60/602 |
| 2013/0297182 A1 * | 11/2013 | Vincenzi | F02D 41/062 701/103 |
| 2013/0317721 A1 * | 11/2013 | Moren | F01N 3/025 701/103 |
| 2013/0345951 A1 * | 12/2013 | Zyla | F02D 19/027 701/104 |
| 2014/0025276 A1 * | 1/2014 | Ryu | F02D 41/00 701/102 |
| 2014/0129115 A1 * | 5/2014 | Teraya | F02D 41/0225 701/103 |
| 2014/0222316 A1 * | 8/2014 | Murai | F02D 41/064 701/104 |

OTHER PUBLICATIONS

Written Opinion issued in International Application PCT/US2014/041644.

* cited by examiner

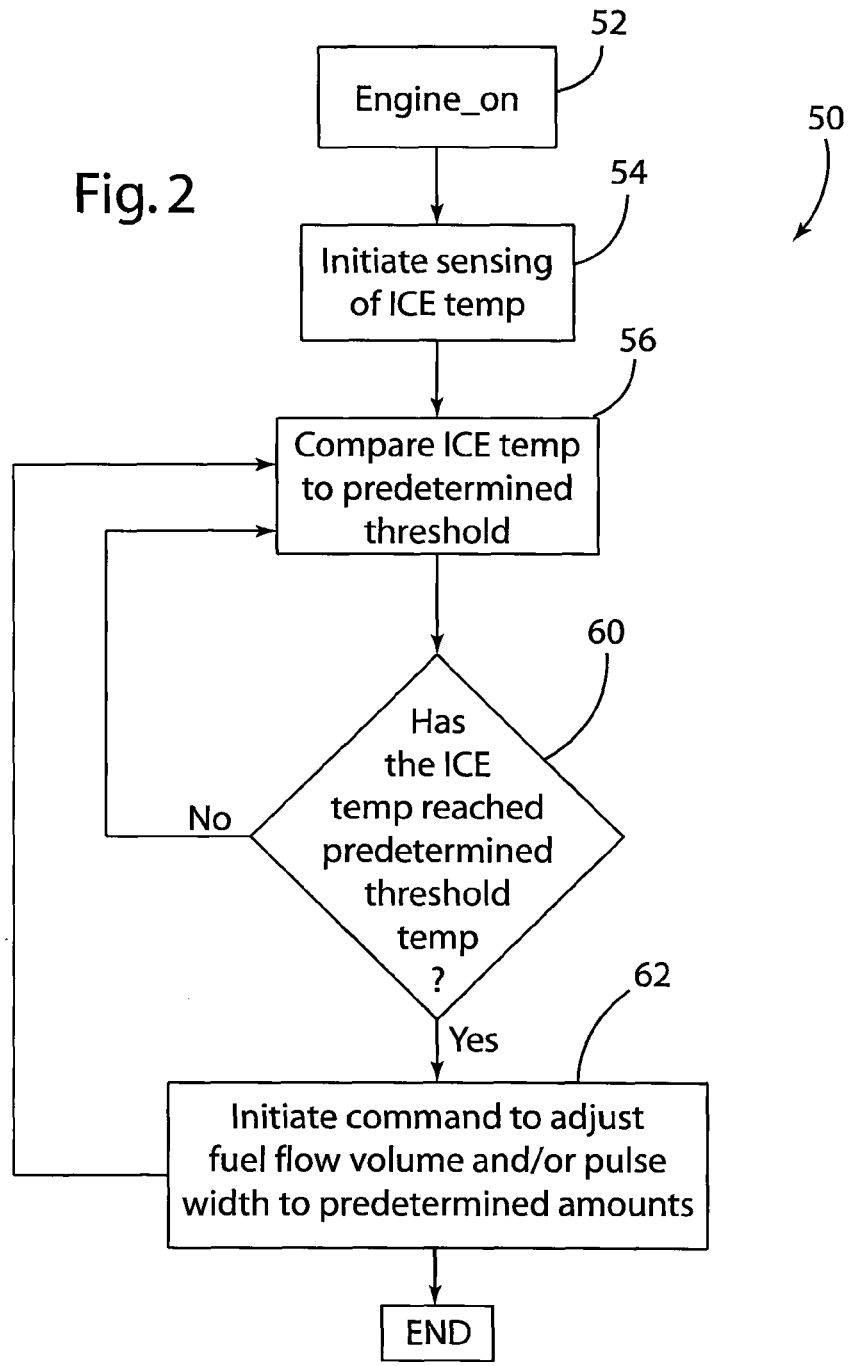

Least fuel - lean burn                     Most fuel-rich burn

CONTROLLERS AND METHODS FOR A FUEL INJECTED INTERNAL COMBUSTION ENGINE

1. FIELD OF INVENTION

Embodiments of the present invention generally relate to controllers and methods for a fuel injected internal combustion engine (ICE), and particularly controllers and methods for controlling the fuel injector in a predetermined response to the ICE reaching at least one predetermined parameter of the ICE.

2. BACKGROUND

In the art of the internal combustion engine (ICE), a device is typically needed to mix air and fuel, the mixture of which is then delivered to the ICE's combustion chamber. This mixture is usually delivered toward the end of the ICE's compression stroke, and then ignited using, for example, a spark plug. In the past, this mixing and delivering was achieved through the use of a carburetor. Over more recent years however, fuel injectors have increasingly replaced the carburetor as the preferred means to deliver fuel to the ICE's combustion chamber. (See generally U.S. Pat. No. 3,430,616 to Glöckler)

A fuel injector vaporizes (atomizes) fuel by pumping it in controlled amounts and under high force through a nozzle (spray tip). Fuel injector components typically include a plunger covering a valve opening. In many instances, the plunger is retracted upon activation of an electronic valve solenoid. This allows pressurized fuel to flow into an atomizer and out of a spray tip. Once the valve solenoid is deactivated, a valve spring returns the plunger to its at-rest position covering the valve opening. Timing the activation of the valve solenoid is controlled by various controllers in the art such as an engine control unit (ECU), a control area network (CAN), and the like. Precise control of the valve opening allows for precise metering of fuel. Fuel injectors provide for easier starting of an ICE as well as increased fuel efficiency and potentially cleaner exhaust emissions because the fuel is metered into the combustion chamber with improved precision and accuracy.

Cleaner emissions can be further improved for an ICE by passing its exhaust emissions through a device known as a catalytic converter. Since exhaust emissions are fairly consistent and predictable, the catalytic converter can convert some of the more toxic emissions to less toxic substances by way of catalyzed chemical reactions. A typical catalytic converter for a gasoline (petro) fueled ICE in a vehicle is a "three way" converter. This type of converter converts the main pollutants in automobile exhaust, namely carbon monoxide (CO), hydrocarbons (unburned fuel) (CxHx) and oxides of nitrogen (NOx). The catalytic converter coverts, by a reduction reaction, nitrogen oxides back to nitrogen (i.e., $2NO_x \rightarrow xO_2 + N_2$). The carbon monoxide components are oxidized to carbon dioxide (i.e., $2CO + O_2 \rightarrow 2CO_2$. The un-burnt hydrocarbons are oxidized to carbon dioxide and water (i.e., $C_xH_{2x+2} + [(3x+1)/2]O_2 \rightarrow xCO_2 + (x+1)H_2O$).

Despite these recent advances in the art, improvement in fuel efficiency and in the reduction if emissions of ICEs are possible and desired.

SUMMARY OF CERTAIN EMBODIMENTS

Broadly speaking, certain embodiments of the invention relate to controllers and methods for a fuel injected ICEs, and particularly for controlling the fuel injector in a predetermined response to the ICE reaching at least one predetermined parameter of the ICE.

In one embodiment a method of testing the fuel efficiency or the emissions output of an internal combustion engine (ICE) having a fuel injector is disclosed. At least one operational parameter of the ICE is sensed while the ICE is running. The operational parameter has a first value, and the fuel injector is configured to be controlled by changes in the operational parameter. The fuel injector is controlled by substituting the first value with a second value when the first value reaches a predetermined value. The second value does not correspond to the operational parameter of the ICE while the ICE is running. Then fuel efficiency or the emissions output of the ICE is measured.

In one aspect the at least one operational parameter of the ICE is selected from the group consisting of a manifold pressure, a fuel pressure, an air temperature, an engine combustion chamber temperature, a coolant temperature, a fuel injector temperature, an engine speed, a throttle position, a barometric pressure, an exhaust emissions, a camshaft sensor, an air/fuel mixture, and any combination thereof.

In another aspect the at least one operational parameter of the ICE is a coolant temperature. The controlling of the fuel injector includes adjusting a pulse width of the fuel injector.

In another aspect the adjusting of the pulse width includes reducing the pulse width from a first width to a second width when the coolant temperature is above 120 degrees Fahrenheit. The first width is a value between about 0.7 and about 1.0 millisecond and the second width is a value between about 0.05 and about 0.2 millisecond.

In another aspect the fuel injector is controlled by a first electrical signal prior to the step of controlling the fuel injector. The adjusting of the pulse width includes overriding the first electrical signal with a second electrical signal that is not equal to the first electrical signal.

In another embodiment, a method of controlling the operation of a fuel injector of an ICE while it is running includes sensing a temperature of the ICE while the ICE is running using a temperature sensor. Temperature information is transmitted from the temperature sensor to a first controller. The operation of the fuel injector is controlled by the first controller in response to the temperature information. The transmitting of the temperature information from the temperature sensor to the first controller is prevented when the temperature of the ICE reaches a predetermined value. Substitute information is transmitted from a second controller to the first controller when the temperature of the ICE reaches the predetermined value. The operation of the fuel injector is controlled by the first controller in response to the substitute information.

In one aspect the sensing of the temperature of the ICE includes sensing the temperature of a coolant of the ICE.

In another aspect the controlling of the fuel injector includes adjusting a pulse width of the fuel injector.

In yet another aspect, the adjusting of the pulse width includes reducing the pulse width from a first width to a second width when the coolant temperature is above about 120 degrees Fahrenheit. The first width is a value between about 0.7 and about 1.0 millisecond, and the second width is a value between about 0.05 and about 0.2 millisecond.

In another embodiment, a device comprises a memory and a processor coupled to the memory. The processor is operable to perform the steps of any of the above-described embodiments.

In yet another embodiment, a device to control an internal combustion engine (ICE) having a fuel injector, a temperature sensor, and a first controller is disclosed. The temperature sensor is configured to generate a plurality of electrical signals that correspond to a plurality of temperatures of the ICE while the ICE is running. The first controller is configured to receive the plurality of electrical signals and to control the operation of the fuel injector in response to these signals. The device includes a memory and a processor coupled to the memory. The processor is operable to receive from the temperature sensor information corresponding to the temperature of the ICE. The processor is further operable to transmit substitute temperature information to the first controller when the temperature of the ICE is within a predetermined range of the plurality of temperatures of the ICE. The substitute temperature information corresponds to a temperature that is different from (i.e., not equal to) the temperature of the ICE when the substitute temperature information is being transmitted to the first controller.

In one aspect the processor is further operable to transmit to the first controller information corresponding to the temperature of the ICE when the temperature of the ICE is outside of the predetermined range of the plurality of temperatures of the ICE.

In another aspect the device further includes a switch having a first position and a second position. When the switch is in the first position, the plurality of electrical signals generated by the temperature sensor is sent to the first controller so that the first controller receives the plurality of electrical signals which have not been processed by the processor. On the other hand when the switch is in the second position, the substitute temperature information is transmitted from the processor to the first controller. The switch is configured to actuate between the first and second positions in response to a command sent by the processor, so that the switch is in the first position when the temperature of the ICE is outside the predetermined range of the plurality of temperatures of the ICE, and in the second position when the temperature of the ICE is within the predetermined range of the plurality of temperatures of the ICE.

In yet another aspect the ICE includes a coolant, and the temperature sensor is a coolant temperature sensor configured to measure the temperature of the ICE coolant. The predetermined range of the plurality of temperatures of the ICE is a range between about 120 degrees and about 250 degrees Fahrenheit.

In yet another embodiment, a non-transitory, computer-readable storage medium is provided. The storage medium contains instructions that, when executed by a processor, cause the processor to perform the steps of any of the above-described embodiments.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which:

FIG. 2 is a process flow diagram according to another embodiment of the invention;

DETAILED DESCRIPTION

Figure 1A:
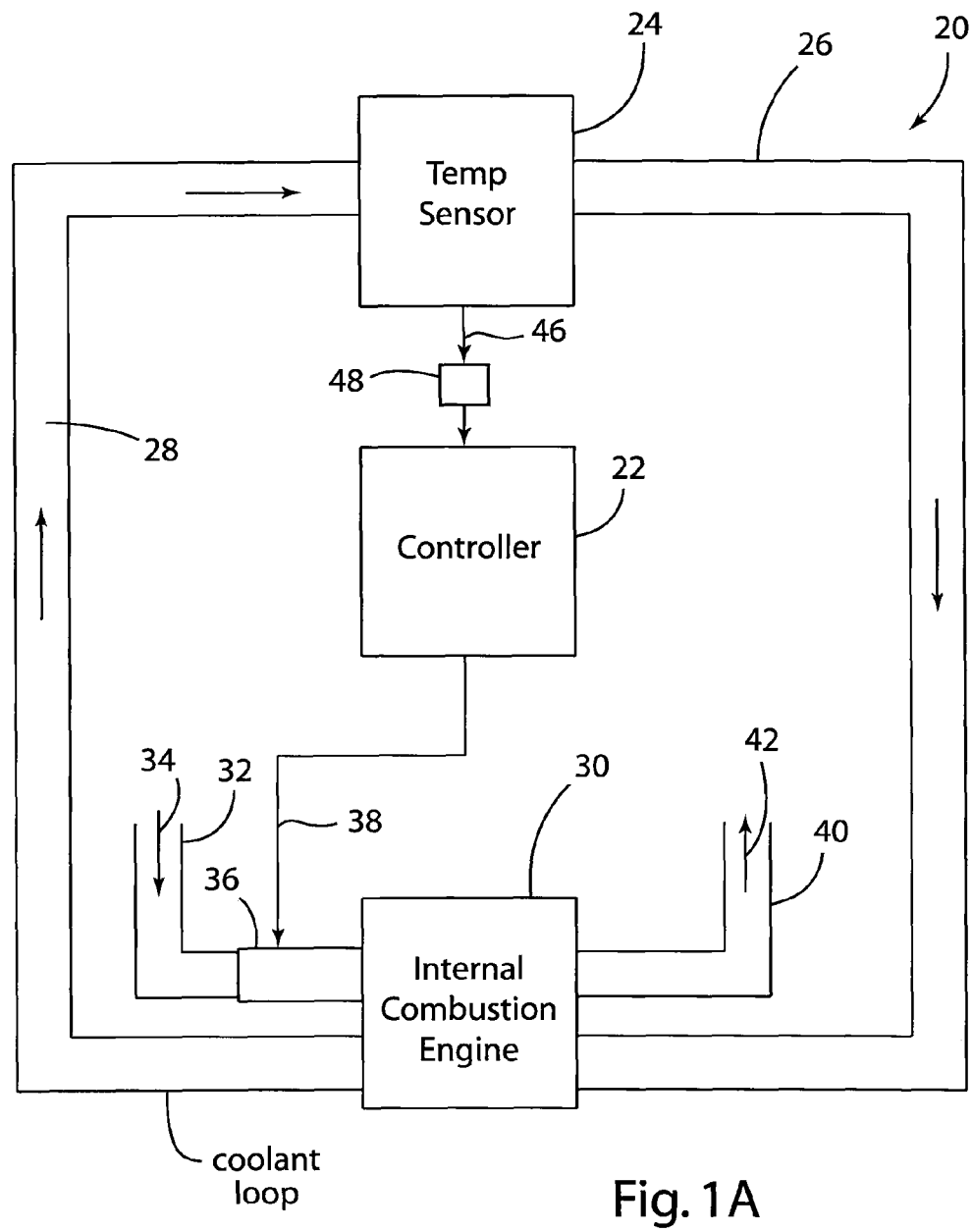
FIG. 1A is a simplified schematic of an engine system according to one embodiment of the invention.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Described herein are controllers and methods for a fuel injected ICE, and particularly controllers and methods for providing an override signal for controlling the fuel injector in a predetermined response to at least one predetermined parameter of the ICE.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present controllers and methods. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, controllers, user selections, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The controllers and methods can be implemented through hardware and/or software. In one embodiment, the controller comprises a device including at least one processor, at least one memory or computer readable medium that stores and executes computer program code to implement its functionality. Such a controller typically includes a system unit having a processor and associated volatile and/or non-volatile memory. Such a controller may also include one or a plurality of I/O devices (i.e., peripheral devices) which are coupled to the system processor and which perform specialized functions.

In portions of this disclosure only one compression cycle of one cylinder of an ICE is described for simplicity and in order to aid in the understanding of certain inventive controllers and methods. It is understood though that the descriptions equally apply to multi-cylinder ICEs that are working cooperatively through other engine components. For example, a camshaft sensor can determine the timing of the fuel injector pulse to occur in a predetermined position, such as 5 to 15 degrees before the top dead center of the compression stroke.

Controllers and methods are provided herein for precision fuel metering for delivering measured amounts of fuel to each cylinder of an ICE of at least once per engine cycle in response to an electronic computer which measures various engine operational and environmental parameters, such as manifold pressure, fuel pressure, air temperature, combustion chamber temperature, coolant temperature, fuel injector temperature, engine speed, throttle position, barometric pressure, exhaust emissions, camshaft sensor, air/fuel mixture, as well as a combination of two or more of these parameters. Such a system provides not only increased fuel economy and output power, but also reduces vehicle emissions, since less fuel overall is delivered to the ICE.

In the art, U.S. Pat. No. 3,504,657 to Eichler et al. describes enriching fuel during cold start-ups. It is believed that fuel air mixture must be enriched for cold starting, because part of the fuel condenses on the cold walls of the intake manifold and only part of the fuel atomizes and becomes available for operation in the engine. Basically, the quantity of fuel required for an engine becomes greater as the engine temperature lowers. Further, the higher the engine speed, the shorter the period of each stroke. Accordingly low-pressure injection at the time of a start-up may cause a condition where an injection period within the period of a single stroke results in an insufficient quantity of fuel being injected, such as for example, when cranking at very low temperatures or when the engine speed is increasing right after a start-up at a low temperature.

In general, certain embodiments of the invention provide novel controllers and methods to adjust the fuel injection parameters for delivering fuel to a combustion chamber to provide a leaner burn than is known in the art by reducing the time the fuel injector spray valve is open, thus delivering less fuel than previously has been considered as optimal in the art. Surprisingly, the reduction of fuel often can provide reduced hydrocarbon and carbon monoxide emissions without loss of power or fuel efficiency.

The effects of the present embodiments often can be seen most clearly in the initial vehicle warm up. In these instances, engine coolant temperature (which is a function of the ICE cylinder temperature) is fed into a control system for fuel injectors. According to other embodiments, the temperature of the engine cylinders or the fuel injector itself can be also considered alone or in any combination with other temperature sensors. In one approach, the fuel delivery parameters from the fuel injector can be adjusted to deliver fuel comparable to the lean-burn parameters of a vehicle having coolant operating at 250 Fahrenheit (° F.), even during engine warm-up when the ICE coolant in fact is much cooler. These parameters can be applied to a vehicle even when the engine coolant temperature is, for example, between 120° F. and 250° F. It is noted that the present parameters provide little or no reduction in power or fuel economy since the reduction in hydrocarbons is the result of more fuel being burned, especially in "cold" engines.

In some aftermarket applications a resistor circuit, or other electronic components (including one or more processors) to modify or override the coolant temperature sensor output signal, can be used to change the fuel delivery of the fuel injector. In one approach, an aftermarket device or controller can be used to override the temperature sensor output at a predetermined ICU temperature reading thereby providing a "ghost" or substitute reading or signal to the engine control unit which in turn will adjust the fuel delivery to a lean-burn mode much more quickly during engine warm-up than is preprogrammed into the engine control unit. According to one embodiment, the device is programmed to override the actual temperature sensor signal when the coolant temperature reaches 120° F., to send this substitute signal to the engine control unit which in turn results in an increased fuel delivery from the fuel injector to that of an ICE running as if its coolant temperature was 250° F. (although the ICE coolant in fact is not running at that temperature). The device can also deactivate or remove its substitute or "ghost" signal to the engine control unit when the actual ICE coolant temperature reaches 250° F. and thereby allow the actual, original temperature sensor output signal (or an alternative signal that is essentially the same as that original signal) to be sent to the engine control unit.

Figure 5:
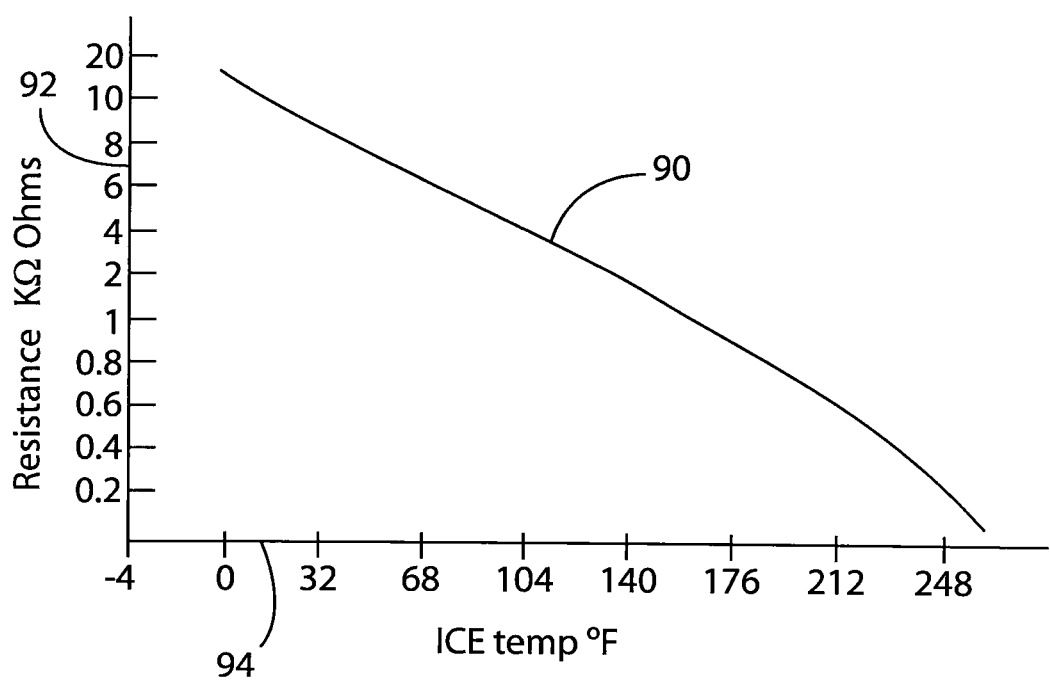
FIG. 5 is a graph of the electrical resistance value in ohms as a function of temperature for an exemplary temperature sensor.

Turning now to FIG. 1, there is shown a simplified schematic of an engine system which is generally indicated at reference numeral 20. The system 20 is under the control of a first controller 22, which is a control unit such as an Engine Control Unit, a Control Area Network, an independent controller, a plurality of controllers working alone or in various combinations, and the like. The first controller 22 essentially receives environmental vehicle inputs (such as such as manifold pressure, air temperature, engine temperature, coolant temperatures, fuel injector temperature, engine speed, throttle position, barometric pressure, and the like) and applies these inputs to various predetermined thresholds and data maps (See e.g., FIGS. 3 and 5) to output a desired control to various vehicle components. In this instance for simplicity, the schematic of the vehicle system 20 just shows a temperature sensor 24 of coolant 28 in the vehicle's coolant loop 26. Here the temperature sensor 24 can read the coolant temperature as a predetermined function of the actual temperature of a cylinder of an ICE 30. The sensor 24 can be a standard thermostat or coolant temperature sensor in the coolant loop 26. The output of the temperature sensor 24 could be delivered directly to the first controller 22, and the system 20 would be operational. However FIG. 1 illustrates the temperature sensor 24 output being delivered to a second controller 48 (which in this embodiment is an aftermarket device) as will be discussed below.

If the second controller 48 was not present in the system 20, the coolant sensor signal 46 would be sent directly to the first controller 22 and compared with stored data thresholds. As a result a command is sent to a fuel injector 36 via a first controller output 38. This command affects the duration that the injector is open for allowing fuel to enter the ICE's combustion chamber. This duration often is referred to as a pulse width. This command, in cooperation with other parameters such as throttle position and camshaft position commands, causes the fuel injector 36 to deliver fuel 34 from a fuel line 32 into the combustion chamber of the ICE 30 where the fuel is ignited, and then vented as exhaust 42 out of the exhaust line 40.

In some embodiments where the data maps in the first controller 22 from the original equipment manufacturer (OEM) are not optimal, an aftermarket solution includes the insertion of a device (i.e., the second controller 48) to intercept the output signal of the temperature sensor 24 and to provide a substitute signal to the first controller 22. The second controller 48 monitors the output of the temperature sensor 24 until a predetermined temperature is reached (e.g., 120° F.) then insert or substitute an altered reading that would correspond to a different ICE coolant temperature (e.g., 250° F.) that is not in fact the actual ICE coolant temperature. The second controller 48 continues to monitor the actual coolant temperature and remove its substitute signal when the actual coolant temperature falls outside a predetermined range (e.g., above 250° F. or below 120° F.). Once actual coolant temperature readings fall outside the thresholds, the second controller 48 allows the actual coolant temperature signal to be sent to the first controller 22. The device could be calibrated using a variety methods and components, and could be preprogrammed for specific vehicle or engine model applications with known specific pulse width maps. In one approach, where the temperature sensor signal is an analog signal where a change in coolant temperature corresponds to a known change in resistance, the second controller 48 can be a tunable by including a variable resistor, such as one sold under the trademark TRIMPOT. For exemplary purposes only, in FIG. 5, a sensor output is measured as a function of engine coolant temperature 94, and mapped at reference numeral 90. The resistance scale 92 is between about 0.05 ohms and about 20,000 ohms.

The controller 22 governs the fuel injector 36 pulse width as predetermined function of engine coolant 28 temperature. These signals from the fuel injector 36 can alter the flow rate of the fuel and the pulse width of fuel. As an example, the injector can go from a first pulse width to a second pulse width in response to the sensor reading crossing above or below 120° F. The pulse width is proportional to the amount of fuel delivered.

Figure 1B:
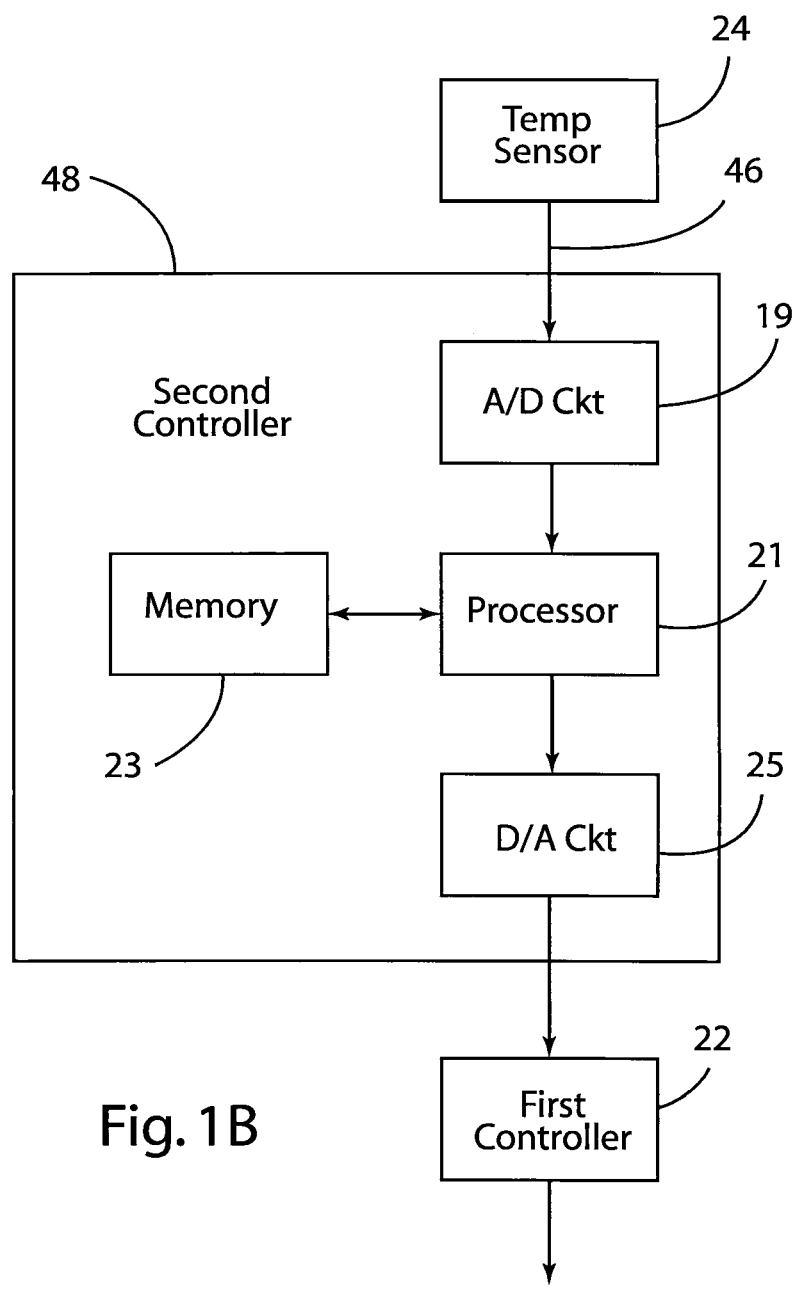
FIG. 1B is a simplified schematic of the second controller component of FIG. 1A.

FIG. 1B is a simplified block diagram of the second controller 48 of FIG. 1A according to an embodiment of the invention. The second controller 48 (which in this embodiment is an aftermarket device) includes an analog to digital converter circuit 19, a processor 21, a memory 23 and a digital to analog converter circuit 25. The analog to digital converter circuit 19 receives from the temperature sensor 24 the analog sensor signal 46 that corresponds to the coolant temperature being detected. The analog to digital converter circuit 19 converts that signal 46 to a digital signal for use by the processor 21. The processor 21 is connected to the memory 23 for storing programs, data and parameters, including, but not limited to, data corresponding a predetermined range of ICE coolant temperatures that will be used to determine when to produce an override or substitute signal. Although FIG. 1B shows the memory device 23 as a separate component, alternative embodiments may use a memory that is integral with the processor 21. The digital to analog converter circuit 25 receives digital signals from the processor 21, converts them to analog signals, and transmits the analog signals to the first controller 22 for use by it.

Thus in operation, the processor 21 receives a signal or information corresponding to the temperature of an ICE. This is compared with predetermined temperature-related data that is stored in the memory 23, and the processor 21 takes the appropriate action using program logic. For example, if the received temperature information falls within a predetermined temperature range, then the processor sends to the first controller 22 (via the digital to analog circuit 25) substitute information corresponding to a temperature that is different from that which actually is being detected by the temperature sensor 24. In other words the processor 21 causes a substitute or override signal (that does not reflect the true ICE temperature) to be sent to the first controller 22. On the other hand if the received temperature information is outside the predetermined temperature range, then a substitute signal corresponding to a temperature that is the same (or essentially the same) as that which actually is being detected by the temperature sensor 24 is sent by the processor 21 to the first controller 22. In other words, the processor 21 effectively operates as if the second controller 48 was not present in the system by sending the first controller 22 this substitute signal that is indicative of the true ICE temperature.

Figure 1C:
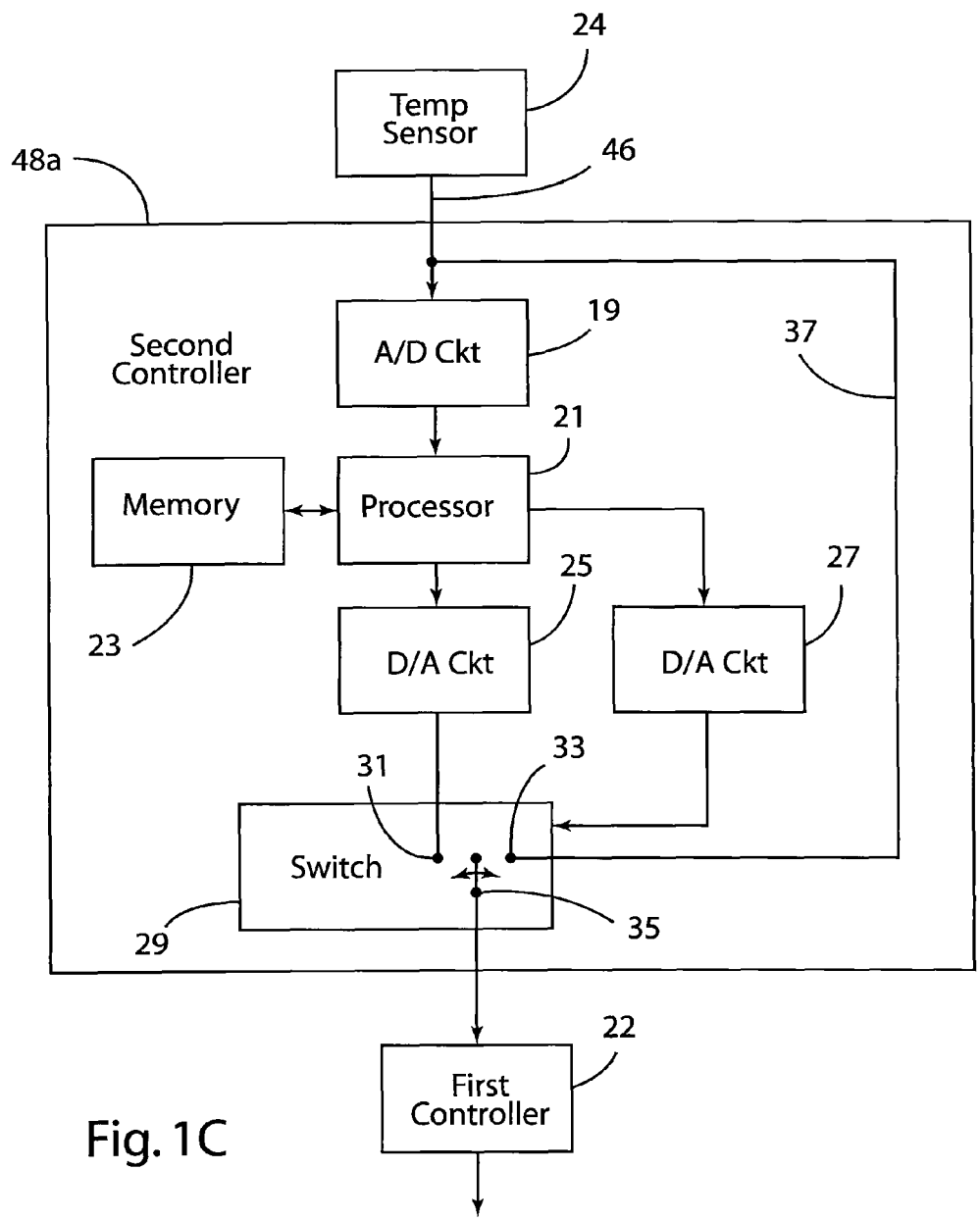
FIG. 1C is a simplified schematic of an alternative embodiment of the second controller component of FIG. 1A.

FIG. 1C is a simplified block diagram of a second controller 48a of FIG. 1A according to an alternative embodiment of the invention. The second controller 48a includes the analog to digital converter circuit 19, the processor 21, the memory 23 and the digital to analog converter circuit 25, all of which are similar to that illustrated and described in connection with FIG. 1B. The analog to digital converter circuit 19 receives from the temperature sensor 24 the analog sensor signal 46 that corresponds to the coolant temperature being detected. The analog to digital converter circuit 19 converts that signal 46 to a digital signal for use by the processor 21. The processor 21 is connected to the memory 23 for storing programs, data and parameters, etc. The digital to analog converter circuit 25 receives digital signals from the processor 21 and converts them to analog signals.

However the second controller 48a of FIG. 1C further includes a second digital to analog converter circuit 27 which received commands from the processor 21 and which has an output connected to a solenoid-operated switch 29. A first input terminal 31 of the switch 29 is electrically connected to the output of the first digital to analog converter circuit 25. A second input terminal 33 of the switch 29 is connected to a bypass line or circuit 37 which receives the analog signal 46 directly from the temperature sensor 24. An output terminal 35 of the switch 29 is connected to the first controller 22. A signal for operating or actuating the switch 29 is received from the second digital to analog converter circuit 27, which in turn receives a digital signal or command from the processor 21. The switch 29 can be in a first position whereby the output terminal 35 is connected to the second terminal 33. Alternatively the switch 29 can be in a second position whereby the output terminal 35 is connected to the first terminal 31.

The switch 29 is normally in its first position so that when it is not receiving an actuating signal from the second digital to analog converter circuit 27, the output terminal 35 of the switch 29 is connected to its second terminal 33. Accordingly the signal 46 from the temperature sensor 24 is sent to the first controller 22 so that it receives a signal which has not been processed by the processor 21. Thus the signal that is received by the first controller 22 traveled via the bypass circuit 37 and thereby bypassed the analog to digital circuit 19, the processor 21 and the first digital to analog circuit 25, essentially as if the second controller 48a was not present in the system 20. (This is advantageous in the event that there is loss of power or a failure of the other components of the second controller 48a, in which event the first controller 22 will continue to receive a signal from the temperature sensor 24.) On the other hand when the program logic dictates that an override signal should be sent to the first controller 22, the processor 21 transmits the appropriate signal to the second digital to analog converter circuit 27 which in turn transmits an analog signal or voltage to the switch 29 thereby actuating it and causing it to change from its first position to its second position. This action in turn isolates the direct feed from the temperature sensor 24 and permits the processor 21 to transmit signals, including substitute temperature information, to the first controller 22.

One of ordinary skill in the art will appreciate that the program logic described herein may be implemented in alternative embodiments in hardware, software, firmware, or a combination thereof. The program logic can be implemented in software or firmware that is stored in memory and that is executed by a processor. If implemented in hardware, the logic may be implemented in any one or combination of volatile memory devices (e.g., random access memory (RAM, such as DRAM, SRAM, SDRAM, etc.)) and non-volatile memory devices (e.g., ROM, EPROM, hard drive, etc.).

Memory may incorporate electronic, magnetic, optical, and/or other types of storage media. Memory may also have a distributed architecture, where various components are situated remotely from one another. If implemented in hardware, the logic may be implemented with any or a combination of the following technologies, which are all known in the art: one or more discrete logic circuits for implementing logic functions upon data signals, an application specific integrated circuit (ASIC), a programmable gate array(s) (PGA), a field programmable gate array (FPGA), etc.

Figure 3:
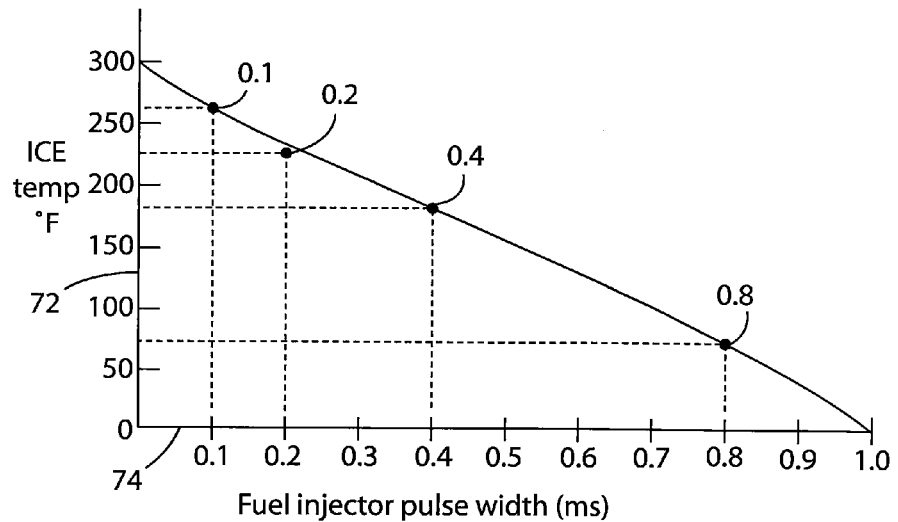
FIG. 3 is a graph of the temperature of an internal combustion engine as a function of fuel injector pulse width as is known in the art.
Figure 4:
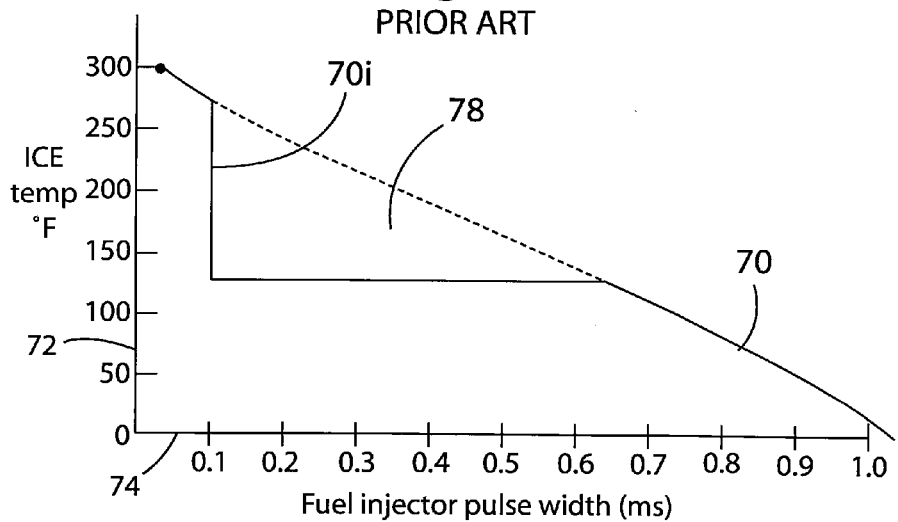
FIG. 4 is a graph of the temperature of an internal combustion engine as a function of fuel injector pulse width according to an embodiment of the invention.

As shown in FIG. 3, a graph 70 is shown that maps values for a controller to apply for a typical correlation of fuel injector pulse width, such that there is a generally linear decrease in pulse width 74 as ICE coolant temperature 72 increases. Thus this reflects the operation of a fuel injector without the use of an override controller, such as the second controller 48 of FIG. 1A. The extremes are shown as a pulse width of 0.1 ms duration for an engine coolant at approximately 260° F. (essentially a mist) to a pulse width of about 0.8 ms for an engine coolant at about 75° F. (For many fuel injectors a 0.8 ms pulse width results in an essentially solid stream of fuel, i.e., a "rich" burn.) It is a goal of embodiments of the present invention to introduce a lean burn earlier during the engine warm-up phase than shown by the graph of FIG. 3. FIG. 4 shows one embodiment where the generally linear pattern of decreasing pulse width is interrupted for a temperature range between about 120° F. and about 250° F. to a value such that the fuel injector pulse width (corresponding to an engine coolant at 250° F.) remains essentially the same for this 120° F. to 250° F. temperature range, as shown at reference numeral 70i. Thus, the pulse width for a coolant temperature between 120° F. and 250° F. remains approximately constant at 0.1 ms throughout this temperature range. It is noted however that many other variations of the lean burn rate are possible.

A process flow diagram for a method of controlling a fuel injector according to one embodiment of the invention is shown in FIG. 2 generally at reference numeral 50. As shown, a controller is initiated at an engine_on event (step 52), which initiates sensing of one or more environmental parameters of the ICE, such as coolant temperature. (step 54) Once the temperature is sensed the controller compares the inputted temperature value as taken from a temperature sensor with a predetermined threshold as taken from data stored in memory, such as data from a data table. (step 56) Next a determination is made whether a threshold has been reached. (step 60) If not, the process returns back to the compare step 56. If yes at step 60, a command is initiated to adjust the pulse width according to a predetermined pulse width retrieved from data stored in the memory. (step 62).

Table 1 below shows what are believed to be typical standardized emissions results for gasoline and diesel motors for engines running under load.

TABLE 1

(Standardized Emissions results based on an engine running under load)

| Gasoline Engine | | Diesel Engine | |
|---|---|---|---|
| Compound | % of total | Compound | % of total |
| $N_2$ | 71 | $N_2$ | 67 |
| $CO_2$ | 14 | $CO_2$ | 13 |
| $H_2O$ | 12 | $H_2O$ | 11 |
| CO | 1-2 | $O_2$ | 10 |
| Trace elements | <0.5 | Trace elements | ~0.3 |
| $NO_x$ | <0.25 | $NO_x$ | <0.15 |
| $C_xH_y$ | <0.25 | CO | <0.045 |
| $SO_2$ | possible traces | PM | <0.045 |
| | | $C_xH_y$ | <0.03 |
| | | $SO_2$ | <0.03 | where:
$N_2$ = Nitrogen
$CO_2$ = Carbon dioxide
$H_2O$ = Water
$O_2$ = Oxygen
$C_xH_y$ (or Hx or HC) = Hydrocarbons
CO = Carbon Monoxide
$NO_x$ = Nitrogen oxides
$SO_2$ = Sulphur dioxide
PM = Particulate matter The emissions of an ICE can be tested and in some cases reduced, however, using embodiments of the present invention. To conduct a test emission results are read from the same test engine under comparable conditions both with and without a controller (such as for example the second controller 48/48a of FIGS. 1A-1C) according to an embodiment of the invention. A stock engine is used as a benchmark control for the engine's exhaust emissions for comparison when the inventive controller was included. It is noted that there are many ways to test using the present embodiments. These were chosen as just one way to demonstrate the effectiveness of the controllers. According to one method, exhaust emissions are measured using an unmodified 5 Gas analyzer sold under the trade mark SNAP-ON HH GAB5. Testing results are for gas concentrations of: oxygen (O2) by percent volume; carbon monoxide (CO) by percent volume; carbon dioxide (CO2) by percent volume; hydrocarbons (CxHy) by parts per million (ppm); and oxides of nitrogen (NOx) by ppm.

The air-fuel ratio (AFR) is also measured and is the mass ratio of air to fuel present in an ICE. If exactly enough air is provided to completely burn all of the fuel, the ratio is known as the "stoichiometric" mixture. AFR is an important measure for anti-pollution and performance-tuning reasons. The lower the excess air, the "richer" the flame. A stoichiometric mixture is considered to have an AFR that has just enough air to completely burn the available fuel. This is rarely achieved in an ICE given the very short time available for the fuel to burn in the combustion chamber for each combustion cycle. For example, in some ICE models this is only about 4-5 milliseconds at an engine speed of 6000 rpm. This is the time that elapses from when a spark is fired until the burning of the fuel air mix is essentially complete after some 80 degrees of crankshaft rotation.

Catalytic converters are designed to work best when the exhaust gases passing through them are the result of the nearly ideal combustion of a stoichiometric mixture. Unfortunately, a mixture of this type burns very hot and can damage engine components if the engine is placed under high load at this fuel-air mixture. Accordingly, stoichiometric mixtures are only preferred under light load conditions. For acceleration and high load conditions, a richer mixture (lower air-fuel ratio) is used to produce cooler combustion products and thereby prevent overheating of the cylinder head. For a gasoline fuel, the stoichiometric air-fuel mixture is approximately 13:1, but U.S. Federal environmental regulations raised the ratio to 14.7:1 to allow the use of catalytic converters. That is, for every one gram of fuel, 14.7 grams of air are required. Any mixture less than 14.7 to 1 is considered to be a rich mixture; any more than 14.7 to 1 is a lean mixture under ideal conditions.

As previously mentioned, a catalytic converter is effective to reduce nitrogen oxides to nitrogen, carbon monoxide to carbon dioxide, and hydrocarbons to carbon dioxide and water. However, many ICEs generate significant pollution during the first five minutes of operation, which is before the catalytic converter has warmed up sufficiently to even be effective.

Embodiments of the present invention are effective for reducing carbon monoxide beyond the effect of the catalytic converter. For example, for some ICE models or designs hydrocarbon emissions of a cold engine at idle are relatively unchanged by the catalytic converter, as would be predicted for a cold catalytic converter. When the controller of one embodiment is used however, the emission of hydrocarbons, even on a cold start engine, are expected to drop to zero or near zero. Also carbon monoxide emissions should also drop from 1.77 percent volume to 0.09 percent volume when cooperating with the catalytic converter. As predicted, the CO2 emissions increased.

In other ICE models or designs, the catalytic converter is fully functioning and handling the removal of hydrocarbons, while the controller of one embodiment of the invention is effective in lowering CO emission. Similar results are expected for a cold engine under load (of certain ICE models) where the catalytic converter working in cooperation with the controller was able to effectively eliminate hydrocarbons and significantly reduce CO emission.

In view of the above, it will be appreciated that certain embodiments of the invention overcome many of the long-standing problems in the art by providing controllers and methods for controlling a fuel injector of an ICE by providing an override signal so that the fuel injector is caused to operate according to at least one predetermined parameter of the ICE.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method of testing the fuel efficiency of an internal combustion engine (ICE) having a fuel injector, comprising:
sensing, via at least one sensor, at least one operational parameter of the ICE while the ICE is running, wherein the operational parameter has a first value, and wherein the fuel injector is configured to be controlled by changes in the operational parameter;
controlling the fuel injector by substituting the first value with a second value when the first value reaches a predetermined value, wherein an injector spray valve of the fuel injector is maintained in an open position for a time sufficient to deliver an amount of fuel to the ICE based on the second value, and wherein the second value does not correspond to the operational parameter of the ICE while the ICE is running;
measuring the fuel efficiency of the ICE after the controlling of the fuel injector; and
further comprising monitoring the first value after the substituting of the first value with the second value, and controlling the fuel injector by removing the substituted second value when the first value falls outside of a predetermined range during the controlling of the fuel injector with the substituted second value.

2. The method of claim 1 wherein the at least one operational parameter of the ICE is selected from the group consisting of a manifold pressure, a fuel pressure, an air temperature, an engine combustion chamber temperature, a coolant temperature, a fuel injector temperature, an engine speed, a throttle position, a barometric pressure, an exhaust emissions, a camshaft sensor, and an air/fuel mixture.

3. The method of claim 1, wherein the at least one operational parameter of the ICE is a coolant temperature and wherein the controlling of the fuel injector includes adjusting a pulse width of the fuel injector.

4. The method of claim 3, wherein the adjusting of the pulse width includes reducing the pulse width from a first width to a second width when the coolant temperature is above 120 degrees Fahrenheit, wherein the first width is a value between about 0.7 and about 1.0 millisecond and the second width is a value between about 0.05 and about 0.2 millisecond.

5. The method of claim 3, wherein the fuel injector is controlled by a first electrical signal prior to the step of controlling the fuel injector, and wherein the adjusting of the pulse width includes overriding the first electrical signal with a second electrical signal that is not equal to the first electrical signal.

6. A method of testing the emissions output of an internal combustion engine (ICE) having a fuel injector, comprising:
sensing, via at least one sensor, a temperature of the ICE while the ICE is running, wherein the temperature is a first value and wherein the fuel injector is configured to be controlled by the temperature of the ICE;
controlling the fuel injector by substituting the first value with a second value when the first value reaches a predetermined value, wherein an injector spray valve of the fuel injector is maintained in an open position for a time sufficient to deliver an amount of fuel to the ICE based on the second value, and wherein the second value does not correspond to the temperature of the ICE while the ICE is running;
measuring the emissions of the ICE after the controlling of the fuel injector; and
further comprising monitoring the first value after the substituting of the first value with the second value, and controlling the fuel injector by removing the substituted second value when the first value falls outside of a predetermined range during the controlling of the fuel injector with the substituted second value.

7. The method of claim 6, wherein the measuring of the emissions of the ICE includes measuring a CO level in an exhaust of the ICE using a CO sensor disposed within the exhaust.

8. The method of claim 6, wherein the sensing of the temperature of the ICE includes sensing the temperature of a coolant of the ICE.

9. The method of claim 6, wherein the controlling of the fuel injector includes adjusting a pulse width of the fuel injector.

10. The method of claim 9, wherein the adjusting of the pulse width includes reducing the pulse width from a first width to a second width when the coolant temperature is above 120 degrees Fahrenheit, wherein the first width is a value between about 0.7 and about 1.0 millisecond and the second width is a value between about 0.05 and about 0.2 millisecond.

11. The method of claim 9, wherein the fuel injector is controlled by a first electrical signal prior to the step of controlling the fuel injector, and wherein the adjusting of the pulse width includes overriding the first electrical signal with a second electrical signal that is not equal to the first electrical signal.

12. A method of controlling the operation of a fuel injector of an internal combustion engine (ICE) while the ICE is running, comprising:
   sensing a temperature of the ICE while the ICE is running using a temperature sensor;
   transmitting temperature information from the temperature sensor to a first controller;
   controlling the operation of the fuel injector by the first controller in response to the temperature information, wherein an injector spray valve of the fuel injector is maintained in an open position for a time sufficient to deliver an amount of fuel to the ICE based on the temperature information;
   preventing the transmitting of the temperature information from the temperature sensor to the first controller when the temperature of the ICE reaches a predetermined value;
   transmitting substitute information from a second controller to the first controller when the temperature of the ICE reaches the predetermined value;
   controlling the operation of the fuel injector by the first controller in response to the substitute information, wherein an injector spray valve of the fuel injector is maintained in an open position for a time sufficient to deliver an amount of fuel to the ICE based on the substitute information; and
   further comprising monitoring the temperature information after the transmitting of the substitute temperature information from the second controller to the first controller, and controlling the operation of the fuel injector by the first controller via removing the substituted temperature information when the temperature information transmitted from the temperature sensor to the first controller falls outside of a predetermined range during the controlling of the fuel injector with the substituted temperature information.

13. The method of claim 12, wherein the sensing of the temperature of the ICE includes sensing the temperature of a coolant of the ICE.

14. The method of claim 13, wherein the controlling of the fuel injector includes adjusting a pulse width of the fuel injector.

15. The method of claim 14, wherein the adjusting of the pulse width includes reducing the pulse width from a first width to a second width when the coolant temperature is above about 120 degrees Fahrenheit, wherein the first width is a value between about 0.7 and about 1.0 millisecond and the second width is a value between about 0.05 and about 0.2 millisecond.

16. A device to control an internal combustion engine (ICE) having a fuel injector, a temperature sensor, and a first controller, wherein the temperature sensor is configured to generate a plurality of electrical signals that correspond to a plurality of temperatures of the ICE while the ICE is running, wherein the first controller is configured to receive the plurality of electrical signals and to control the operation of the fuel injector in response to the plurality of electrical signals, the device comprising:
   a memory and a processor coupled to the memory and operable to:
      receive from the temperature sensor information corresponding to the temperature of the ICE;
      transmit substitute temperature information to the first controller when the temperature of the ICE is within a predetermined range of the plurality of temperatures of the ICE, wherein an injector spray valve of the fuel injector is maintained in an open position for a time sufficient to deliver an amount of fuel to the ICE based on the substitute temperature information, wherein the substitute temperature information corresponds to a temperature that is not equal to the temperature of the ICE when the substitute temperature information is being transmitted to the first controller; and
   wherein the processor is further operable to monitor the temperature sensor information after the substitute temperature information is transmitted to the first controller, and to control the operation of the fuel injector via removing the substituted temperature information when the temperature sensor information falls outside of a predetermined range during control of the fuel injector with the substituted temperature information.

17. The device of claim 16 wherein the processor is further operable to transmit to the first controller information corresponding to the temperature of the ICE when the temperature of the ICE is outside of the predetermined range of the plurality of temperatures of the ICE.

18. The device of claim 16 further comprising a switch having a first position and a second position,
   wherein the device is configured so that when the switch is in the first position, the plurality of electrical signals generated by the temperature sensor is sent to the first controller so that the first controller receives the plurality of electrical signals which have not been processed by the processor,
   wherein the device is further configured so that when the switch is in the second position, the substitute temperature information is transmitted from the processor to the first controller, and
   wherein the switch is configured to actuate between the first and second positions in response to a command sent by the processor, so that the switch is in the first position when the temperature of the ICE is outside the predetermined range of the plurality of temperatures of the ICE, and the switch is in the second position when the temperature of the ICE is within the predetermined range of the plurality of temperatures of the ICE.

19. The device of claim 16 wherein the ICE further includes a coolant, wherein the temperature sensor is a coolant temperature sensor configured to measure the temperature of the ICE coolant, and wherein the predetermined range of the plurality of temperatures of the ICE is a range between about 120 degrees and about 250 degrees Fahrenheit.

\* \* \* \* \*